US011242693B1

(12) United States Patent
Galindo

(10) Patent No.: US 11,242,693 B1
(45) Date of Patent: Feb. 8, 2022

(54) ABOVE GROUND TORNADO SHELTER

(71) Applicant: Steve Galindo, Tulsa, OK (US)

(72) Inventor: Steve Galindo, Tulsa, OK (US)

( * ) Notice: Subject to any disclaimer, the term of this patent is extended or adjusted under 35 U.S.C. 154(b) by 0 days.

(21) Appl. No.: 16/915,648

(22) Filed: Jun. 29, 2020

(51) Int. Cl.
| *E04H 9/14* | (2006.01) |
| *E04B 1/343* | (2006.01) |
| *E04B 1/32* | (2006.01) |
| *E04B 1/08* | (2006.01) |

(52) U.S. Cl.
CPC .............. *E04H 9/14* (2013.01); *E04B 1/08* (2013.01); *E04B 1/3205* (2013.01); *E04B 2001/3276* (2013.01)

(58) Field of Classification Search
CPC .. E04B 1/08; E04B 1/3205; E04B 2001/3276; E04H 9/14
USPC ................................................ 52/79.1, 169.1
See application file for complete search history.

(56) References Cited

U.S. PATENT DOCUMENTS

| 3,512,316 | A | * | 5/1970 | Parr ........................ F16B 2/14 52/91.1 |
| 3,847,341 | A | | 11/1974 | Stickler, Jr. |
| 4,787,181 | A | * | 11/1988 | Witten ................. E04B 1/3483 220/4.21 |
| 5,123,874 | A | * | 6/1992 | White, III ........... E04B 1/34321 181/290 |
| 5,224,315 | A | * | 7/1993 | Winter, IV ............... E04B 1/14 428/218 |
| 6,948,281 | B1 | * | 9/2005 | Carmichael ............. E04H 9/14 52/86 |
| 8,534,001 | B2 | * | 9/2013 | Scott, IV ................. E04H 9/10 52/2.11 |
| 8,621,790 | B2 | * | 1/2014 | Lekhtman ............... E04H 9/02 52/167.1 |
| 9,797,153 | B2 | * | 10/2017 | Baggiero, II ............ E04H 9/14 |
| 10,584,509 | B1 | | 3/2020 | Zagorski |
| 2003/0075285 | A1 | * | 4/2003 | Anderson ............... E06B 9/264 160/90 |
| 2003/0126805 | A1 | * | 7/2003 | Roberts ................... E04H 9/14 52/80.1 |
| 2005/0284035 | A1 | * | 12/2005 | DeOvando ............ E04B 1/3431 52/79.1 |
| 2006/0185260 | A1 | * | 8/2006 | Dehart ..................... E04H 9/10 52/36.1 |
| 2009/0004430 | A1 | * | 1/2009 | Cummins ................ F42D 5/045 428/113 |
| 2009/0217600 | A1 | * | 9/2009 | De Azambuja .... B65D 90/0006 52/79.5 |

(Continued)

OTHER PUBLICATIONS

Abandoned U.S. Appl. No. 15/276,685 by Steve Galindo filed Sep. 26, 2016; not published.

*Primary Examiner* — Brian E Glessner
*Assistant Examiner* — James J Buckle, Jr.
(74) *Attorney, Agent, or Firm* — James F. Lea, III; Gable Gotwals

(57) ABSTRACT

A tornado shelter and having a reinforced monolithic construction resulting from a single pour of concrete is described herein. Rebar extends upwardly from a base. The rebar is encased in concrete that forms the walls of the shelter. An upper portion of the rebar extend above a top surface of each of the walls. The upper portion of each of said rods are bent inwards and are also encased in the single pour of concrete for strengthening a ceiling portion of the shelter. A door, in-wall conduits, vent orifices and attached benches may also be provided.

15 Claims, 13 Drawing Sheets

(56) References Cited

U.S. PATENT DOCUMENTS

| | | | |
|---|---|---|---|
| 2010/0043309 A1* | 2/2010 | Martin | E03C 1/01 |
| | | | 52/79.5 |
| 2010/0050556 A1* | 3/2010 | Burns | E04B 1/34321 |
| | | | 52/592.1 |
| 2012/0222367 A1* | 9/2012 | Wirtz | E04H 9/10 |
| | | | 52/79.1 |
| 2013/0019542 A1* | 1/2013 | Bishop | E04H 1/125 |
| | | | 52/79.11 |
| 2014/0259976 A1* | 9/2014 | Bowers | E04H 9/14 |
| | | | 52/79.5 |
| 2015/0068466 A1* | 3/2015 | Piccioni | E04H 1/005 |
| | | | 119/448 |
| 2015/0096478 A1* | 4/2015 | Magiera | E04H 9/06 |
| | | | 109/23 |
| 2015/0308135 A1* | 10/2015 | Athanasiou | E04H 1/12 |
| | | | 52/79.5 |
| 2017/0211268 A1* | 7/2017 | Eichhorn | B32B 3/08 |

* cited by examiner

① CONCRETE FOUNDATION OR FLOOR BY OTHERS

② TRIM OUT VERTICAL LEG OF BASE FOR DOORS.

③ DOORS BEYOND

④ CONCRETE FILLED WALL

⑤ CONCRETE FILLED WALL BEYOND

⑥ CONCRETE FILLED ATTIC

⑦ 4"x3"x 1/4" STEEL ANGLE RAFTERS @ 42" ON CENTERS

⑧ SHORED UP 3/4" PLYWOOD CONCRETE FORMS

⑨ 1/2" STEEL ROD SLIDE LATCH

① CONCRETE FOUNDATION
OR FLOOR BY OTHERS

② TRIM OUT VERTICAL LEG OF BASE FOR DOORS.

③ DOORS PAIRED RE: DETAIL 2
④ CONCRETE FILLED WALL
⑤ CONCRETE FILLED ATTIC
⑥ 4"x3"x 1/4" STEEL ANGLE RAFTERS @ 42" ON CENTERS

⑦ SHEET METAL CORNER TRIM

① CONCRETE FOUNDATION OR FLOOR BY OTHERS
② SHEET METAL CORNER TRIM
③ CONCRETE FILLED WALL
④ CONCRETE FILLED ATTIC
⑤ 4"x3"x 1/4" STEEL ANGLE RAFTERS @ 42" ON CENTERS
⑥ VENT OPENING
⑦ 3"x3"x1/4" STEEL ANGLE SILL

ABOVE GROUND TORNADO SHELTER

FIELD OF THE INVENTION

This application relates generally to structures, and more particularly to a monolithic tornado shelter that can be easily installed in or around a finished building such as a home or school.

BACKGROUND OF THE INVENTION

Tornados kill dozens of people in the United States alone each year. They can arise suddenly and with extreme violence, making it difficult or impossible for many to seek community shelter. Hardened tornado shelters are typically expensive and require extensive construction, permits and significant money. Tornado shelters may also be unavailable for existing homes with a small yard for the same reasons. What is needed is a robust and affordable tornado shelter that can be easily installed in a garage or on a concrete pad near a home with minimal skill and expense required.

SUMMARY OF THE INVENTION

A tornado shelter is described herein. The tornado shelter has a base that defines four sides, four corners and a center. A plurality of rods, such as rebar, extend upwardly from each of the four sides. The rods may be welded to the base.

Walls extend upwardly from each of the four sides of the base. An upper portion of the rods extend above a top surface of each of the walls. The upper portion of each of said rods are bent towards said center of the base for strengthening a ceiling portion of the shelter. The rods located inside each of the walls and the upper portion of the rods inside said ceiling portion are encased in a monolithic concrete member resulting from a single pour.

A door is preferably provided within a door opening formed in at least one of the walls. A conduit may be provided within at least one of the walls and the ceiling portion. An orifice may be provided within at least one of the walls for air ventilation. A bench may be affixed to the base.

The tornado shelter may be constructed by placing the base at a desired location. The base provided with an outer angle iron extending upwardly at each of said four corners and an inner angle iron extending upwardly at each of the four corners. The vertical rods are affixed to the base. An inside concrete form is placed adjacent to the inner angle iron and an outside concrete form is placed adjacent to the outer angle iron. The vertical rods are between the inside concrete form and said outside concrete form. A top ceiling form is placed on a top surface of the inside concrete form. An upper portion of the rods that extend above the top surface of the inside concrete form and the outside concrete form are bent towards the center of the base. A single pour of concrete is poured for filling a space between the inside concrete form and the outside concrete form and for covering the upper portion of the rods above the top ceiling form.

After the concrete cures, the inside concrete form, the outside concrete form and the top ceiling form may be removed. A door may be hingedly affixed in a door opening in one of the walls. A conduit may be placed in between the inside and outside concrete forms and above the ceiling form. Vents may be formed in at least one of the walls. A bench may be affixed to the base.

Tornado shelters are disclosed that are made from a monolithic steel frame welded together onsite or in a factory and then transported to the shelter location where concrete is poured into the frame creating a robust, durable, and safe shelter.

In one embodiment, a channel, such as a steel channel is placed for a base in a square or rectangular configuration. In a preferred embodiment, the channel is 6" in width.

An angle iron is vertically affixed at an inside corner and an outside corner at each corner of the base. In a preferred embodiment, the angle iron and rebar are welded to the base. In a preferred embodiment, the rebar is 10' in length. The upper 4' of the rebar is bent towards the inside of the building for strength.

Inside forms and outside forms are placed adjacent to the vertical angle iron and rebar. A top ceiling form is placed on a top surface of the inside forms. The rebar is further bent to the center of the structure over the top panel.

A single pour of cement is poured to deliver concrete between the inside forms and outside forms and above the top ceiling form. The inside forms and the ceiling form is removed after the cement has cured.

A door is constructed with square tubing. The door preferably has steel skin on both sides. The door components will be layered and welded to a flat area in front to the doorway framed wall channel. All of the door structure is welded together for strength. Preferably, the door will swing to the inside and will be provided with two cross-door latch bars to lock the door in place.

In a preferred embodiment, the units will have conduit located in the walls for future electric installations. Additionally, the unit is preferably provided with two 4" by 16" orifices for air ventilation. The unit is preferably provided with two welded benches located in the unit.

DETAILED DESCRIPTION OF THE PREFERRED EMBODIMENTS

The following description supplies specific details in order to provide a thorough understanding. Nevertheless, the skilled artisan would understand that embodiments of tornado shelter frames and associated methods of using them can be implemented and used without employing these specific details. Indeed, exemplary embodiments and associated methods can be placed into practice by modifying the illustrated units and associated methods and can be used in conjunction with any other devices and techniques conventionally used in the industry. For example, while the description below generally focuses on an embodiment with a complete frame constructed prior to transportation, the frame may be formed in panels or sections prior to final welding and assembly on site.

One exemplary embodiment of a monolithic tornado shelter frame (shelter) 100 is illustrated in FIGS. 1-6. Shelter 100 may include frame 110, base 120, and roof 130. Frame 110, base 120, and roof 130 may be formed from steel and welded together to form a monolithic shelter frame 100. Frame 110 may be formed (as illustrated) of angle iron welded together to form a skeleton that may then be formed up with concrete to finish the walls and ceiling. Shelter 100 may be installed inside of a garage, on a back porch or on some other concrete surface to provide a stable foundation. The shelter may be stocked with supplies for an emergency, leaving enough room for people and pets to comfortably and safely ride out a tornado.

Figure 1:
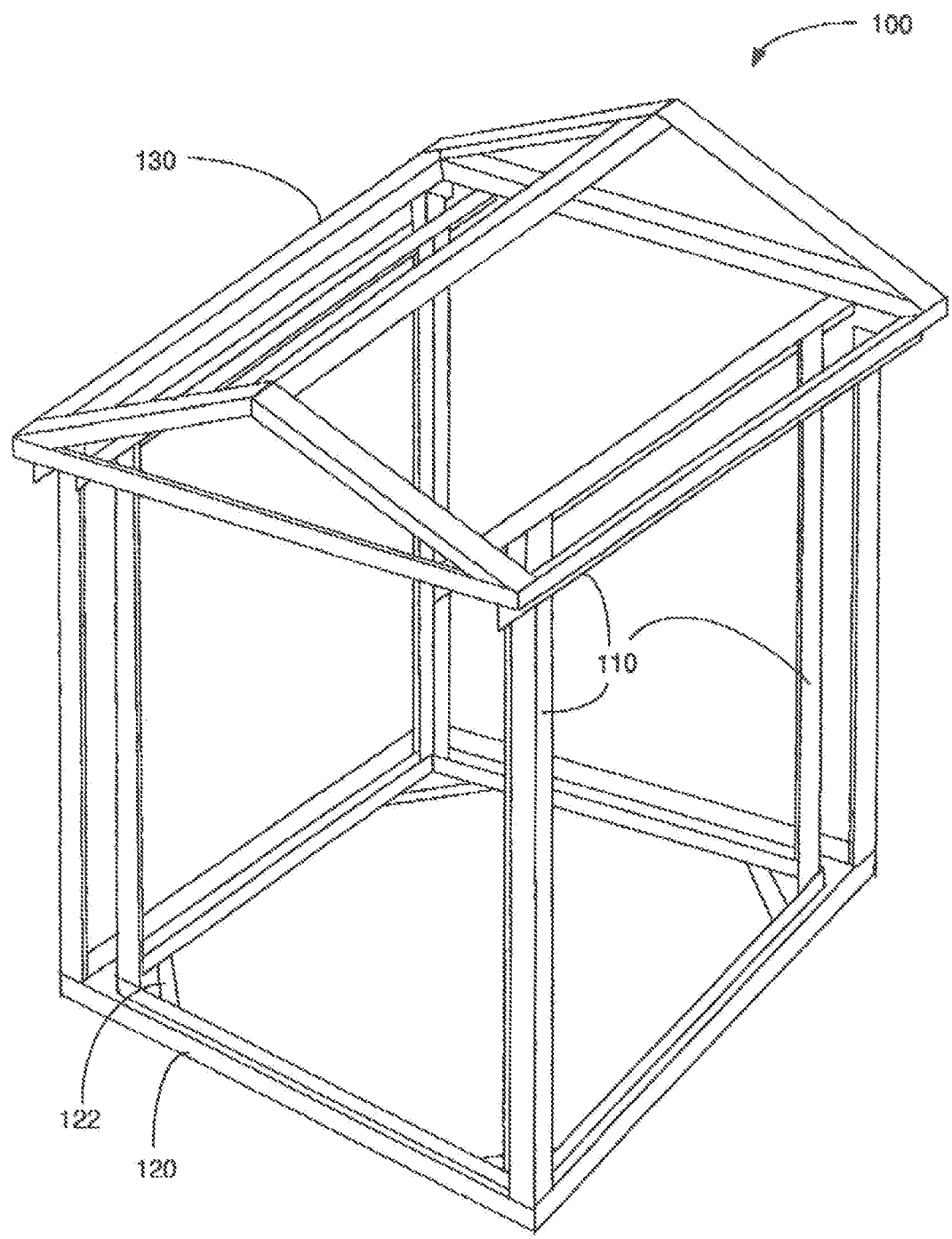
FIG. 1 is a drawing of an exemplary monolithic tornado shelter frame prior to door and vent installation.
Figure 2:
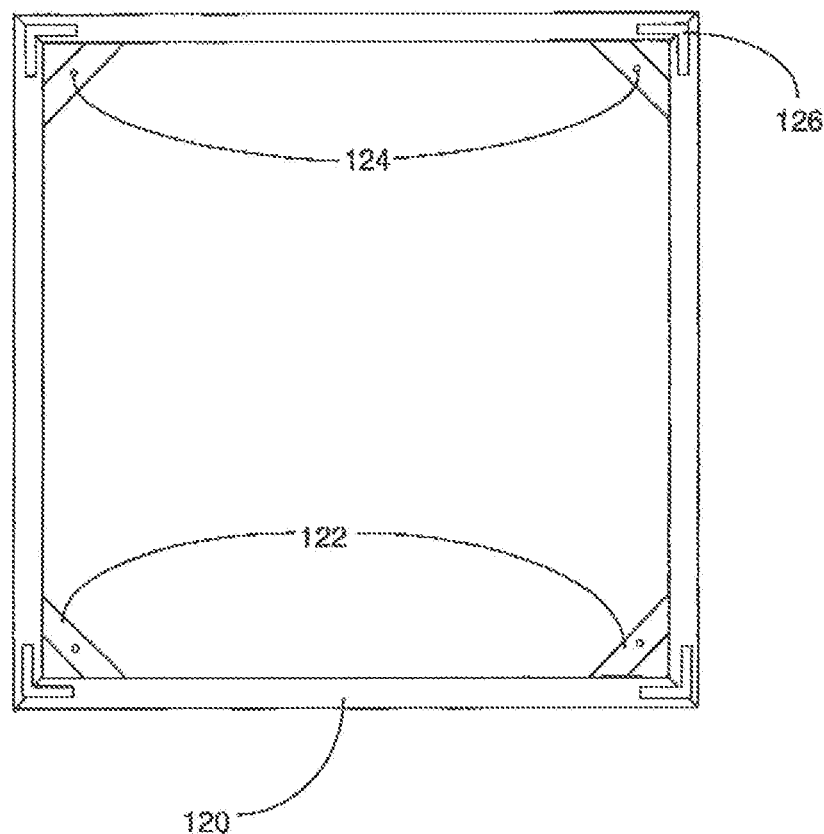
FIG. 2 is a top view of a base of an exemplary monolithic tornado shelter frame.

Turning to FIG. 2, base 120 may include a periphery formed from channel steel to provide a bottom support for the concrete and a strong base for the tornado shelter. The channel steel may be selected to form a desired thickness of wall depending on the size of the shelter and the desired strength. For example, 6×3×⅜ inch channel steel may be selected for a structure with six inch thick walls and strong crush resistance. The channel steel may be welded together at the corners to form a monolithic steel base for shelter 100. Corner braces 122 may be welded into the corners to provide anchor points 124 to secure base 120 and shelter 100 to a concrete floor or pad. Each corner may further include reinforcing braces 126 to further strengthen base 120.

Figure 3:
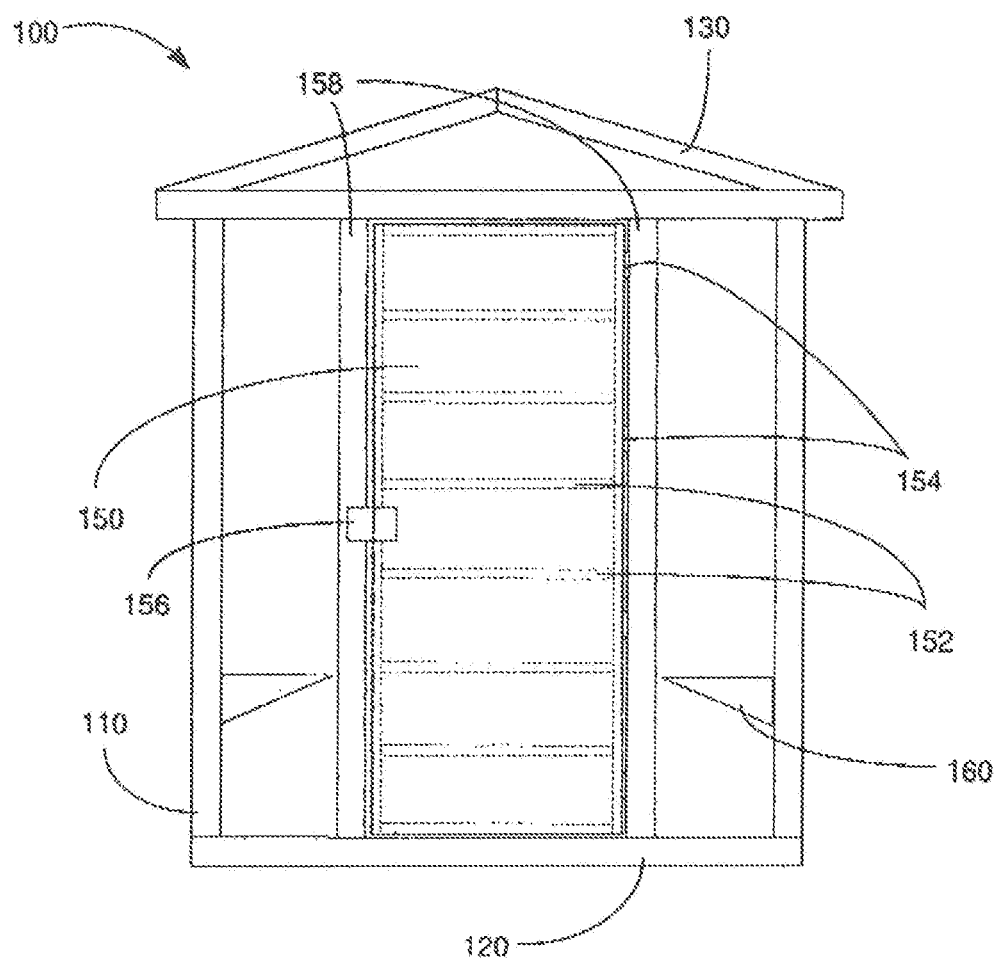
FIG. 3 is a front view of an exemplary monolithic tornado shelter frame with a door and doorjamb installed.

Turning to FIG. 3, shelter 100 may include door 150 and benches 160. Door 150 may be formed from 1"×⅜" tube steel (or other suitable sized steel) body welded in a ladder formation and with a sheet steel skin on the outside or on both the outside and inside to resist damage from flying debris. Door 150 may be secured to shelter 100 between door frame pillars 158 formed of channel steel and welded to frame 110, base 120 and roof 130. Door 150 may be attached with strong hinges 154 and latch 156. Hinges 154 and latch 156 may be any strong and durable hinges and latches sufficient to withstand wind and debris damage that a tornado and collapsing home might inflict on door 150.

Roof or ceiling 130 may have a slight pitch and overhang from welding angle iron to each other to form the overhang and basic roof structure. The overhang will depend on the size of angle iron used and placed as desired. Roof 130 also includes a ridge that may be formed by welding angle iron together. It is important to note that structure 100 is made very strong by welding all structural components of shelter frame 100 together. Frame 110 may be formed using angle iron welded into the corners of base 120 and then welding to top plates of angle iron to form a structure for a poured concrete ceiling and roof within frame member of roof 130.

Figure 4:
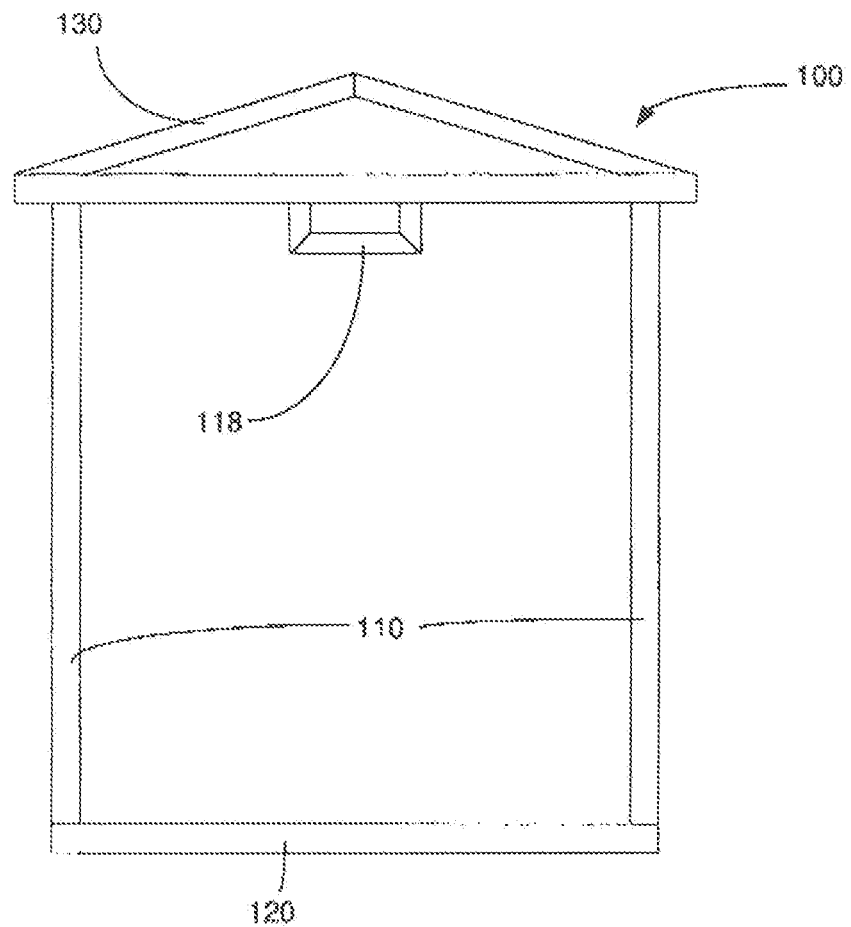
FIG. 4 is a back view of an exemplary monolithic tornado shelter frame with a pressure vent.

As shown in FIG. 4, a small pressure vent 118 may be included in a side or back of shelter 100. The vent 118 may be formed from angle iron welded to the top plate and under the overhang to prevent blockage and debris from harming people inside of the shelter in an emergency. Preferably, vent 118 and surrounding structure are of sufficient strength that the vent opening can be used as lift points for facilitating relocation of shelter 100.

Figure 5:
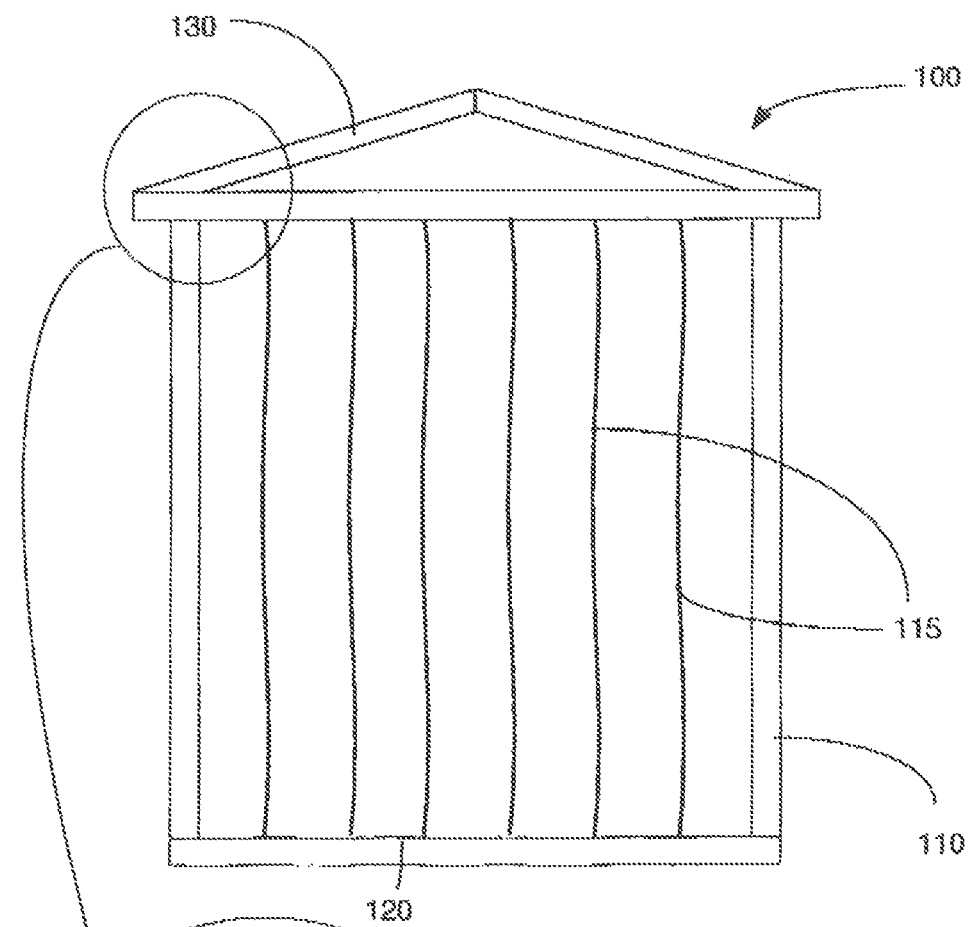
FIG. 5 illustrates rebar placement in the walls and ceiling of an exemplary monolithic tornado shelter frame to effectively tie the steel frame to the concrete.
Figure 6:
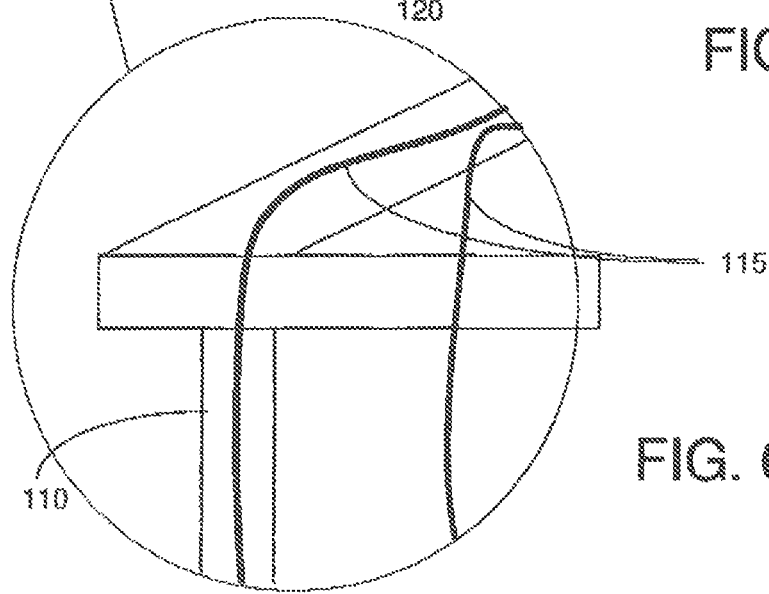
FIG. 6 illustrates rebar placement in the walls and ceiling of an exemplary monolithic tornado shelter frame to effectively tie the steel frame to the concrete.

FIGS. 5 and 6 illustrate rebar reinforcement 115 placed within frame 110 and roof 130. The rebar 115 may be bent so that it is continuous from poured concrete walls and into the poured concrete ceiling. The rebar 115 may be welded to base 120, tied to frame ties used in the concrete forms, or may include horizontal rebar (not shown) tied in to achieve high strength in the final steel and concrete structure.

In some embodiments, a shelter frame such as is shown in the figures may be manufactured in a factory to avail cheaper labor and faster manufacturing. The frame may then be loaded onto a truck and placed at the desired location. The sizes of tornado shelter frames may be selected to fit inside of average garages and could be rolled into the garage under the garage door with dolly wheels, making installation fairly easy and without requiring structural modification and expensive building permits. The shelter 100 may be less than 7' tall to accommodate garages, under patios, etc.

Once in place, base 120 may be secured to the floor and concrete forms may be put into place and concrete poured to fill the walls and ceiling using conventional methods such as concrete pumps to allow the tornado shelter to be finally installed. Using this method, many homes may have tornado shelters that in the past may have cost lives.

Referring now to FIGS. 7-15, a tornado shelter 200 is disclosed that is made from a monolithic steel frame welded together onsite, or in a factory and then transported to the shelter location where concrete is poured into the frame creating a robust, durable, and safe shelter.

In one embodiment, base channel 202 (FIG. 7), such as steel channel, comprise base assembly 210 in a square or rectangular configuration. In a preferred embodiment, the base channel 202 channel is 6" in width.

Figure 7:
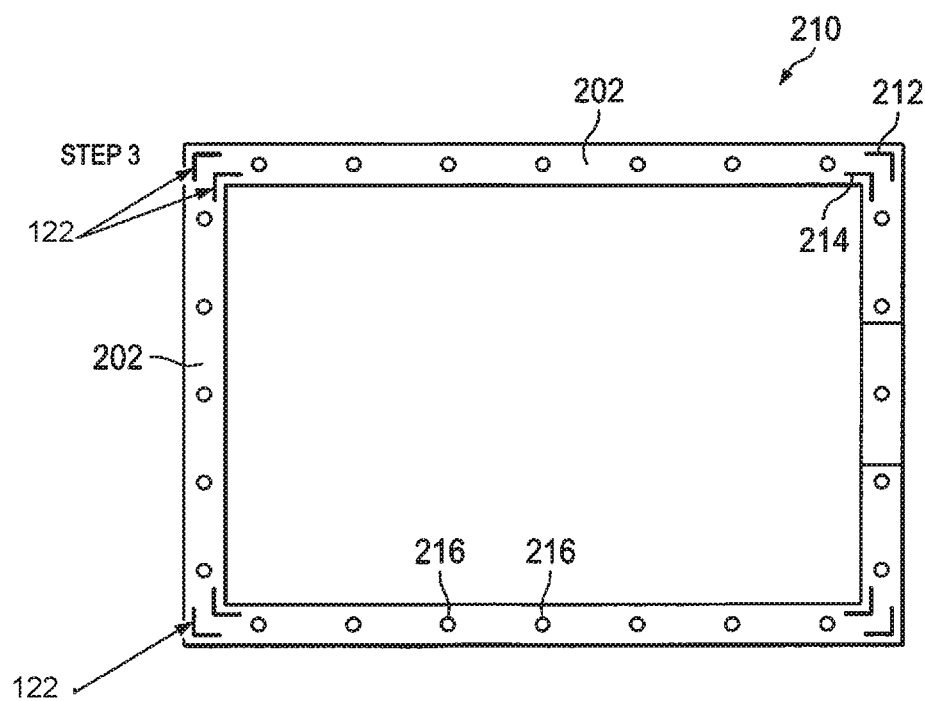
FIG. 7 is a plan view of a base of a second embodiment of a tornado shelter of the invention.
Figure 8:
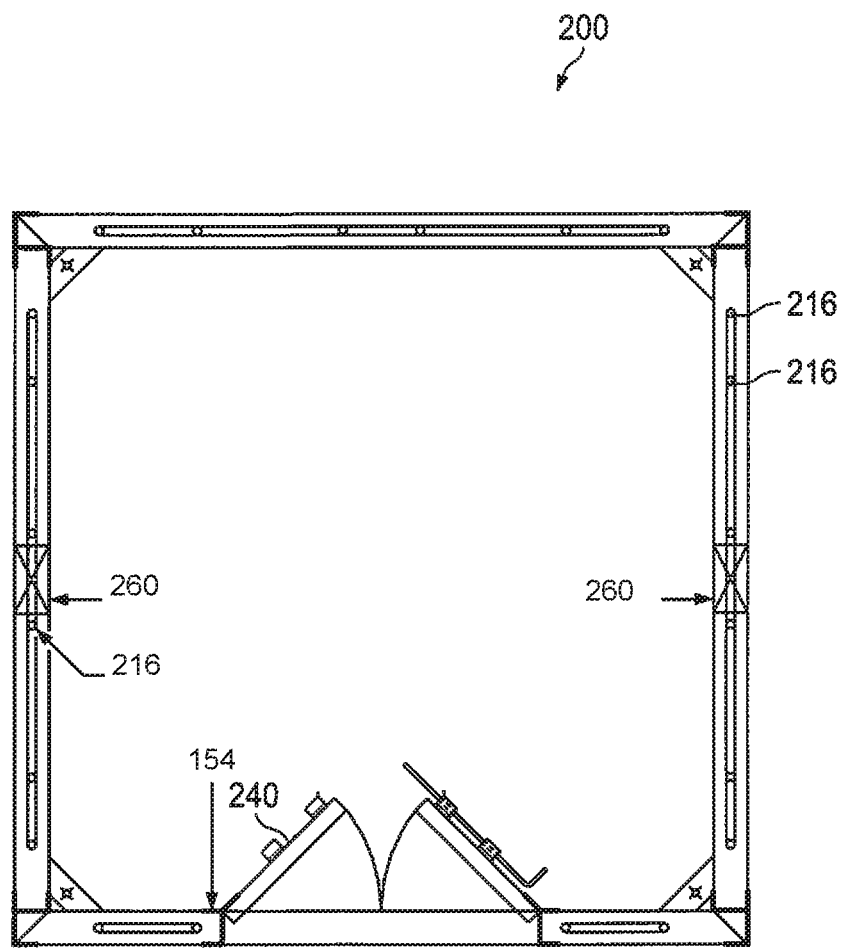
FIG. 8 is a plan view of the walls and door of the tornado shelter of FIG. 7.
Figure 14:
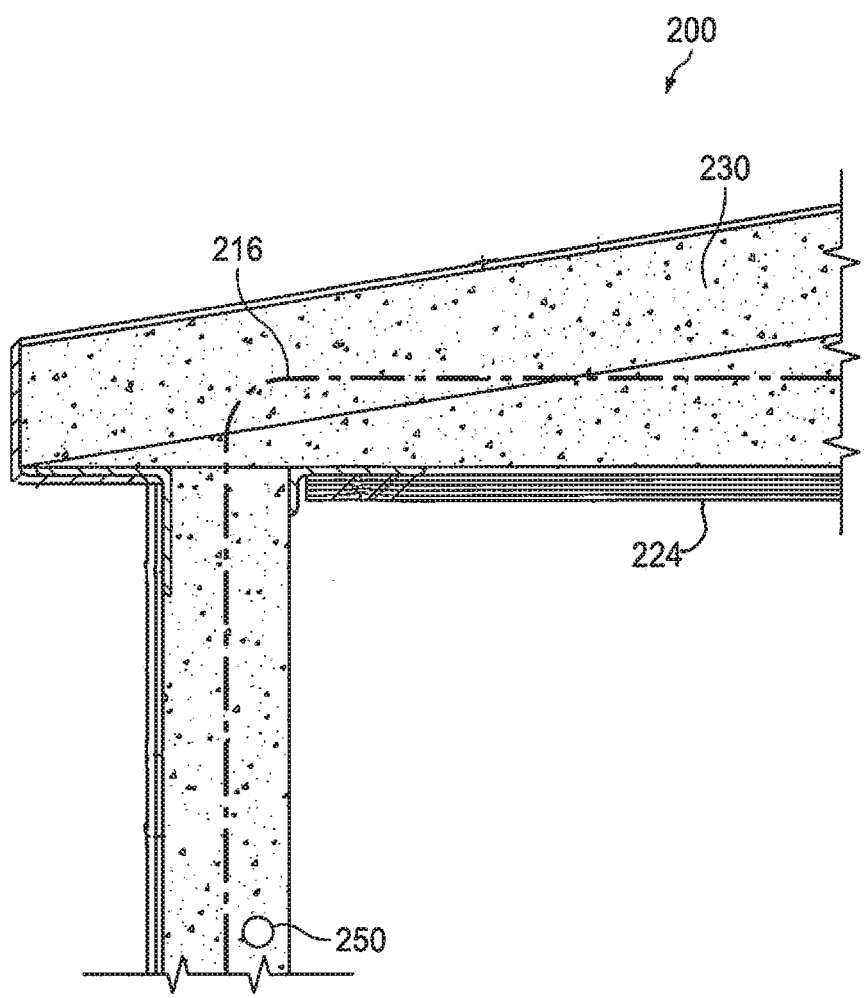
FIG. 14 is an enlarged cross sectional elevation view of an interface between a ceiling portion and a wall with bent rebar shown encased therein.

Still referring to FIG. 7, outer angle iron 212 is vertically affixed at an outside corner at each corner of base assembly 210. Inner angle iron 214 is vertically affixed at an inside corner at each corner of base assembly 210. Rebar 216 is vertically affixed to base channel 212 of base assembly 210. In a preferred embodiment, angle iron 212, 214 and rebar 216 are welded to base assembly 210. In a preferred embodiment, rebar 216 is 10' in length. As best seen in FIG. 14, the upper 4' of rebar 216 is bent towards the inside of the shelter 200 for strength.

Figure 9:
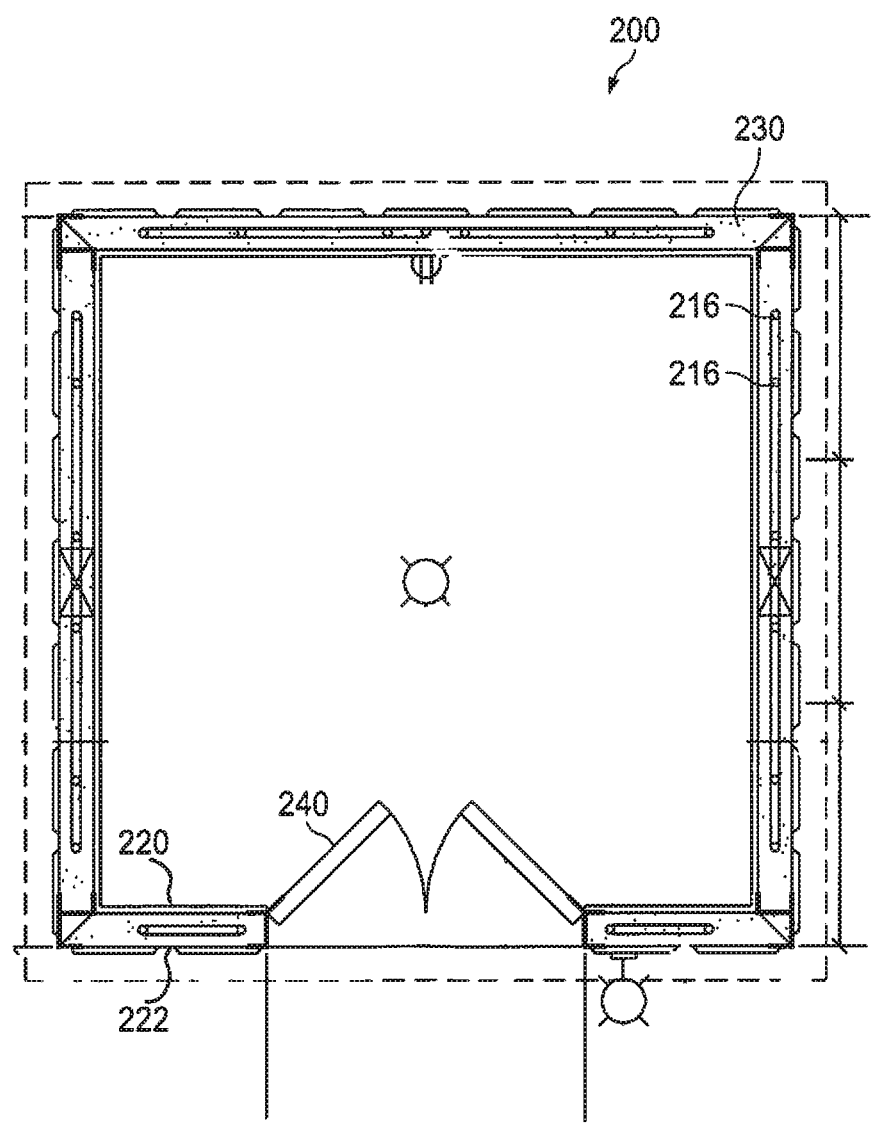
FIG. 9 is a cross section of the plan view of FIG. 8 showing openings and electrical conduit.
Figure 10:
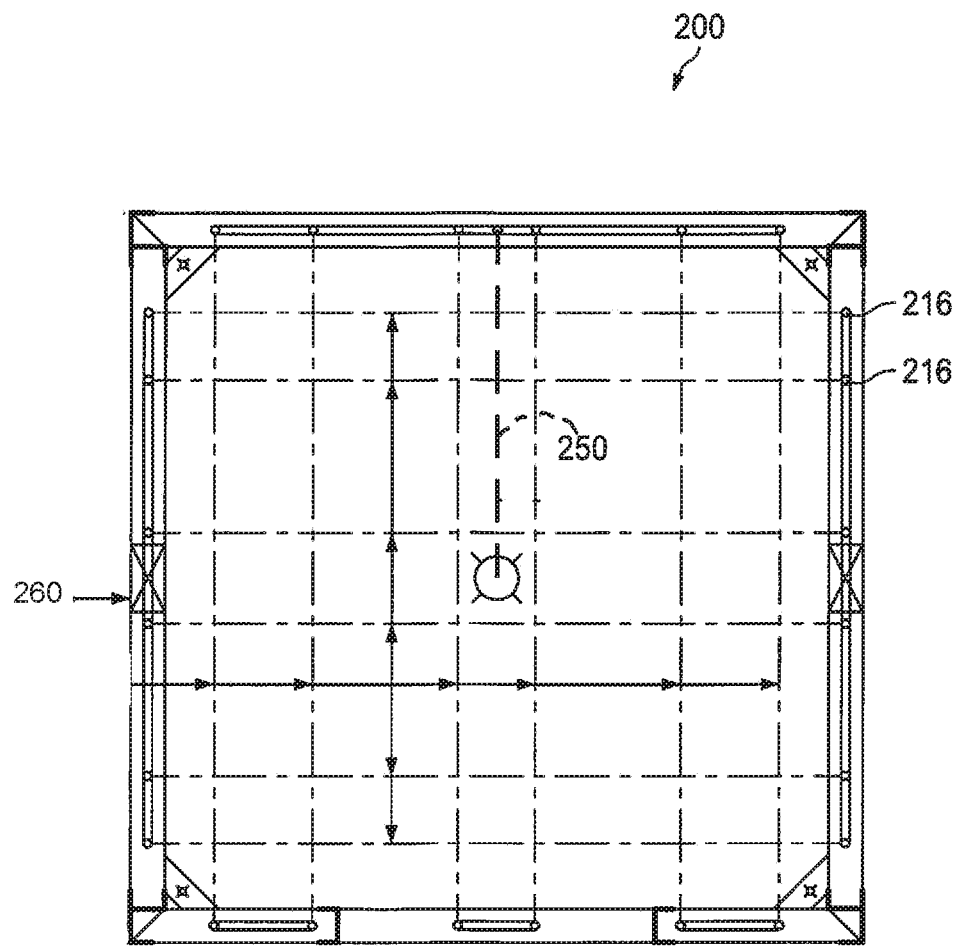
FIG. 10 is a plan view of the shelter of FIG. 7 showing the ceiling and electrical conduit.
Figure 11:
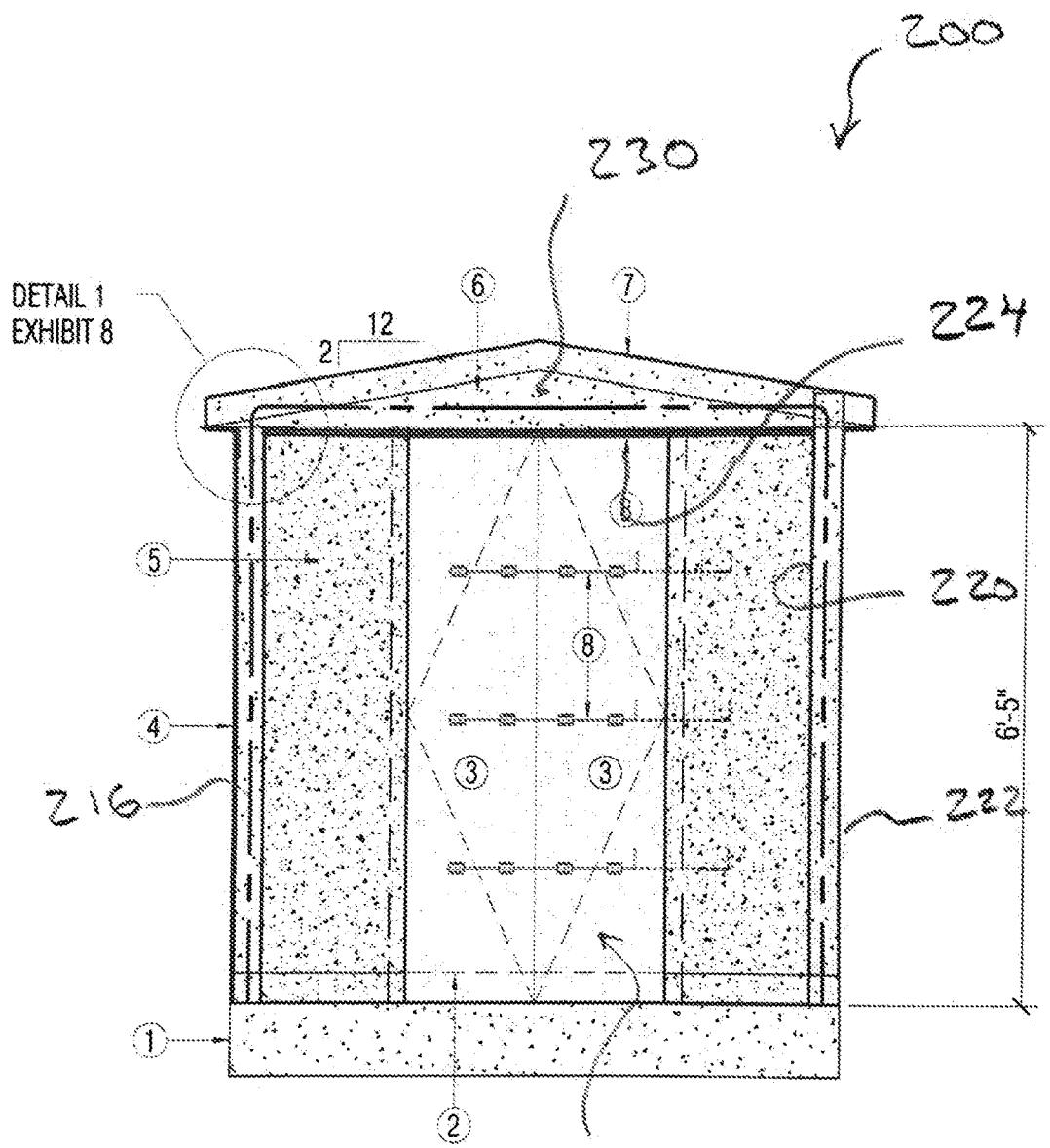
FIG. 11 is an elevation view of the shelter of FIG. 7 showing a wall with a door opening.
Figure 12:
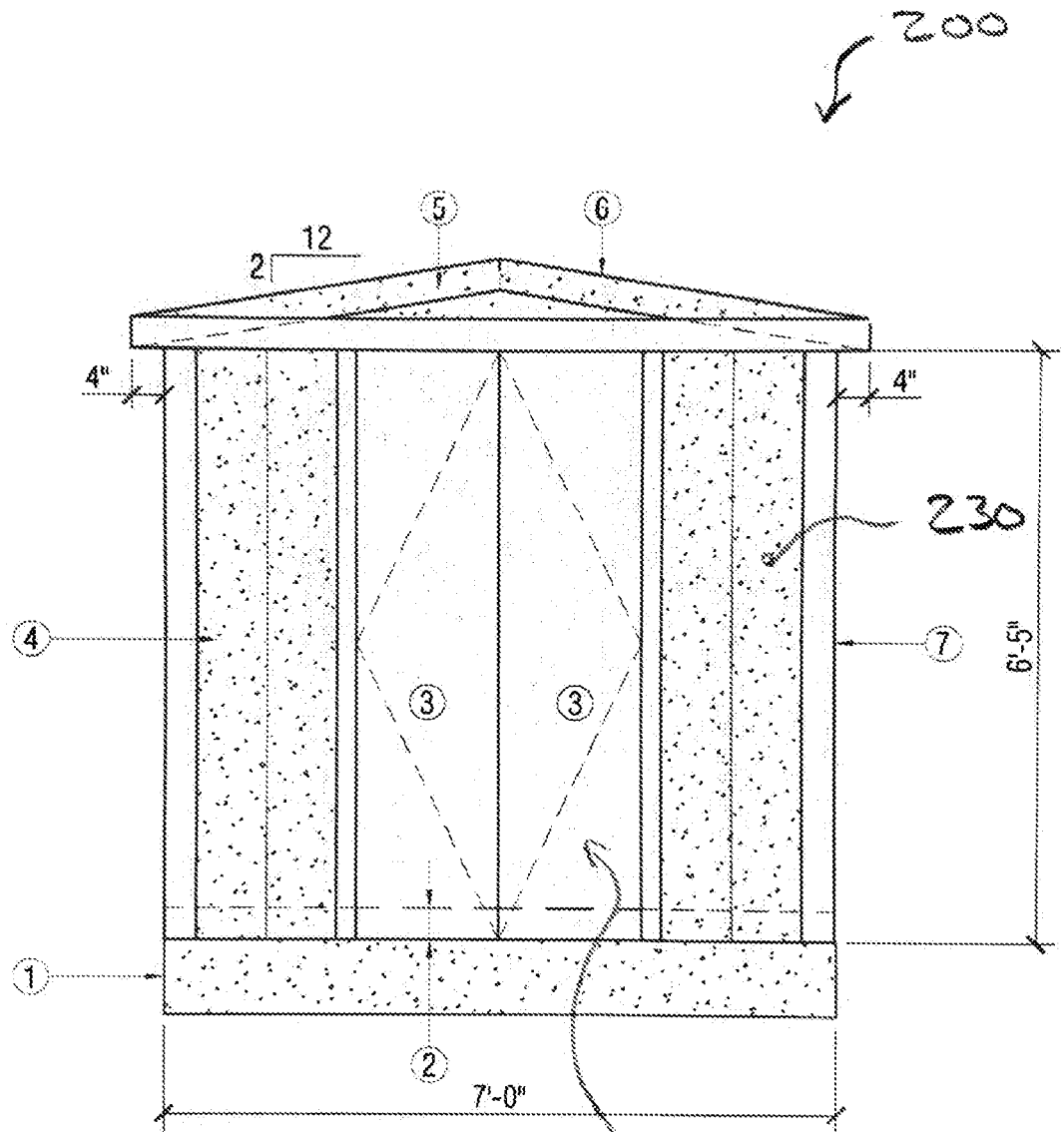
FIG. 12 is an elevation view of the shelter of FIG. 7 showing a wall with a door opening and door installed therein.
Figure 13:
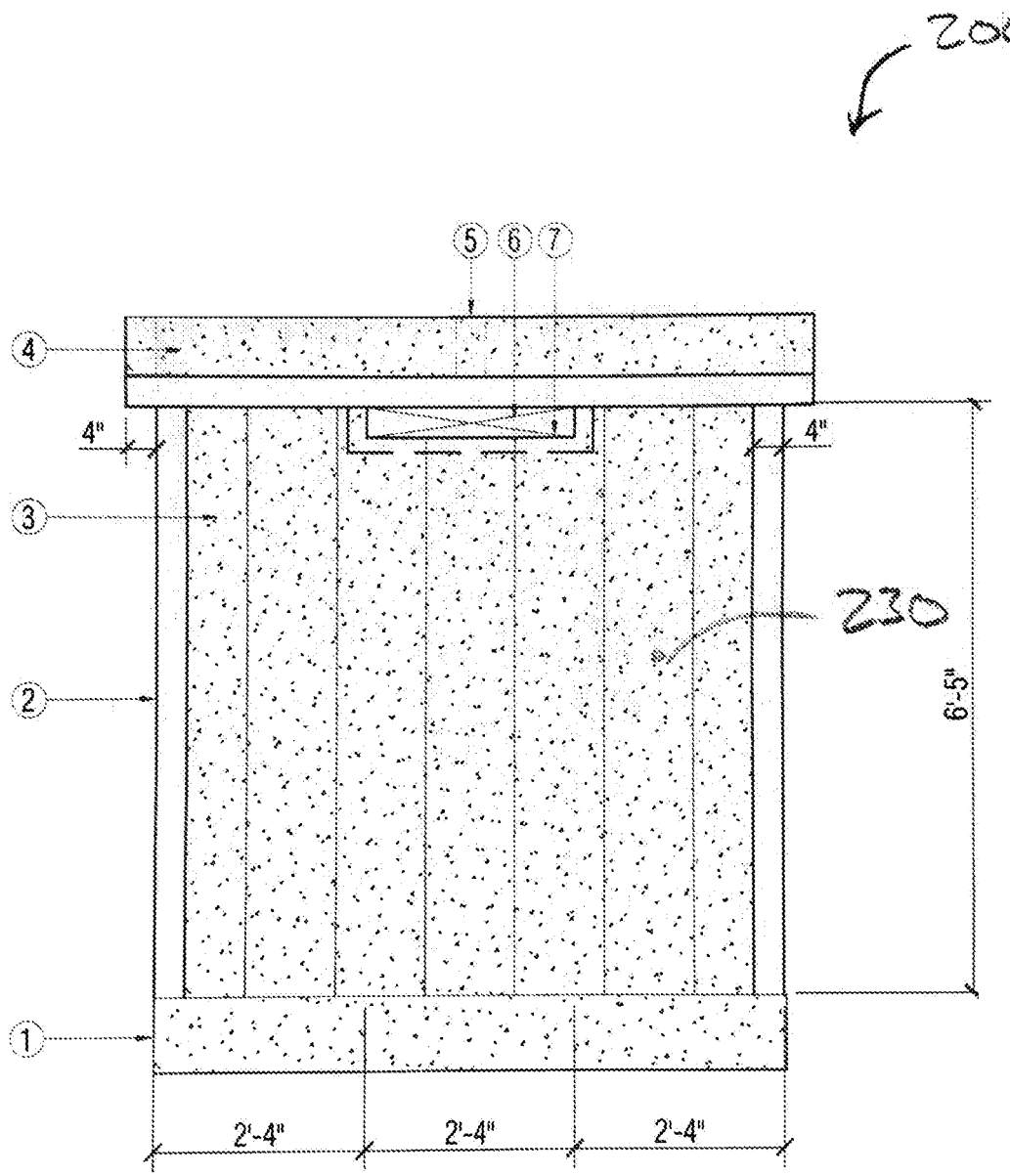
FIG. 13 is an elevation view of the shelter of FIG. 7 showing a vent opening formed in a wall.

Inside forms 220 are placed adjacent to inner angle iron 214. Outside forms 222 are placed adjacent to outer angle iron 216 (FIG. 9). Top ceiling form 224 is placed on a top surface of the inside forms 220. Rebar 216 is further bent to the center of the shelter 200 over top ceiling form 224.

A single pour of cement 230 is poured to deliver concrete between inside forms 220 and outside forms 222 and above top ceiling form 224. Inside forms 220 and top ceiling form 224 is preferably removed after cement 230 has cured.

Door 240 is preferably constructed with square tubing. Door 240 preferably has steel skin on an inside surface and an outside surface. Components of door 240 are layered and welded to a flat area in front to a doorway framed wall channel. All of the structure of door 240 is preferably welded together for strength. Preferably, door 240 swings to the inside of structure 200 and will be provided with two cross-door latch bars to lock door 240 in place.

In a preferred embodiment, shelter 200 has conduit 250 located cement 230 forming the walls and/or ceiling of shelter 200 for possible electric installations. Additionally, shelter 200 may be provided with vents 260, e.g., two 4" by 16" orifices for air ventilation. Shelter 200 is preferably provided with two welded benches located inside shelter 200.

In addition to any previously indicated modification, numerous other variations and alternative arrangements can be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use can be made without departing from the principles and concepts set forth herein. Also, as used herein, examples are meant to be illustrative only and should not be construed to be limiting in any manner.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

What is claimed is:

1. A tornado shelter comprising:
   a base defining four sides, four corners and a center;
   a plurality of rods extending upwardly from each of said four sides;
   a wall extending upwardly from each of said four sides, each of said walls having a top surface;
   a ceiling portion spanning between said top sides of said walls;
   a pitched roof defining an attic space between said pitched roof and said ceiling portion;
   wherein an upper portion of said rods extends above said top surface of each of said walls;
   wherein said upper portion of said rods above said top surface of each of said walls are bent towards said center of said base for strengthening said ceiling portion of the shelter;
   wherein said plurality of rods are inside each of said walls and said upper portion of said rods inside said ceiling portion are encased in concrete; and
   wherein said attic space is filled with said concrete.

2. The tornado shelter according to claim 1 wherein: said rods are rebar.

3. The tornado shelter according to claim 1 wherein: said rods are welded to said base.

4. The tornado shelter according to claim 1 wherein: at least one of said walls define a door opening; a door received in said door opening.

5. The tornado shelter according to claim 1 wherein: at least one of said walls and said ceiling portion define a conduit.

6. The tornado shelter according to claim 1 wherein: at least one of said walls define an orifice for air ventilation.

7. The tornado shelter according to claim 1 further comprising:
   a bench affixed to said base.

8. A method of constructing a tornado shelter comprising the steps of:
   placing a frame base at a desired location, said frame base defining four sides, four corners and a center, said base having an outer angle iron extending upwardly at each of said four corners and an inner angle iron extending upwardly at each of said four corners;
   locating vertical frame members adjacent said frame base;
   locating horizontal frame members adjacent a top end of said vertical frame members;
   locating pitched roof frame members extending above said horizontal frame members and defining an attic space therebetween;
   affixing vertical rods extending upwardly from said sides of said frame base;
   placing an inside concrete form adjacent said inner angle iron, said inside concrete form having a top surface;
   placing an outside concrete form adjacent said outer angle iron, said outside concrete form having a top surface;
   wherein said vertical rods are between said inside concrete form and said outside concrete form;
   placing a top ceiling form on said top surface of inside concrete form;
   wherein an upper portion of said rods extend above said top surface of said inside concrete form and said outside concrete form;
   bending said top portion of said rods towards said center of said frame base;
   pouring a single pour of concrete for filling a space between said inside concrete form and said outside concrete form and for filling said attic space and covering said upper portion of said rods above said top ceiling form.

9. The method according to claim 8 further comprising: removing said inside concrete form, said outside concrete form and said top ceiling form after said concrete cures.

10. The method according to claim 8 further comprising: hingedly affixing a door in a door opening in one of said walls.

11. The method according to claim 8 further comprising: placing a conduit in a location selected from a group consisting of in between said outside concrete form and said inside concrete form and above said ceiling form.

12. The method according to claim 8 further comprising: forming vents in at least one of said walls.

13. The method according to claim 8 further comprising: affixing a bench to said base.

14. A method of constructing a tornado shelter comprising the steps of: constructing a frame at a first location, said frame comprising vertical frame members and horizontal frame members adjacent a top end of said vertical frame members: transporting said frame to a second location; placing said frame at said second location; placing an inside concrete form adjacent said vertical frame members, said inside concrete form having a top surface; placing an outside concrete form adjacent said vertical frame members, said outside concrete form having a top surface; placing a top ceiling form adjacent said top surface of inside concrete form; after said step of transporting, pouring a single pour of concrete for filling a space between said inside concrete form and said outside concrete form; the steps of: locating pitched roof frame members extending above said horizontal frame members and defining an attic space therebetween; wherein said step of pouring a single pour of concrete fills said attic space.

15. The method according to claim 14 further comprising the steps of: affixing vertical rods extending upwardly adjacent said vertical members; wherein said vertical rods are between said inside concrete form and said outside concrete form; wherein an upper portion of said rods extend above said top surface of said inside concrete form and said outside concrete form; bending said top portion of said rods towards said center of said frame base; wherein said step of pouring a single pour of concrete covers said tipper portion of said rods above said top ceiling form.

\* \* \* \* \*